July 11, 1961

W. R. ABBOTT 2,992,411

RANDOM PULSE SYNCHRONIZER

Filed Feb. 16, 1956

INVENTOR.
WILTON R. ABBOTT

BY

*William P. Lane*

ATTORNEY

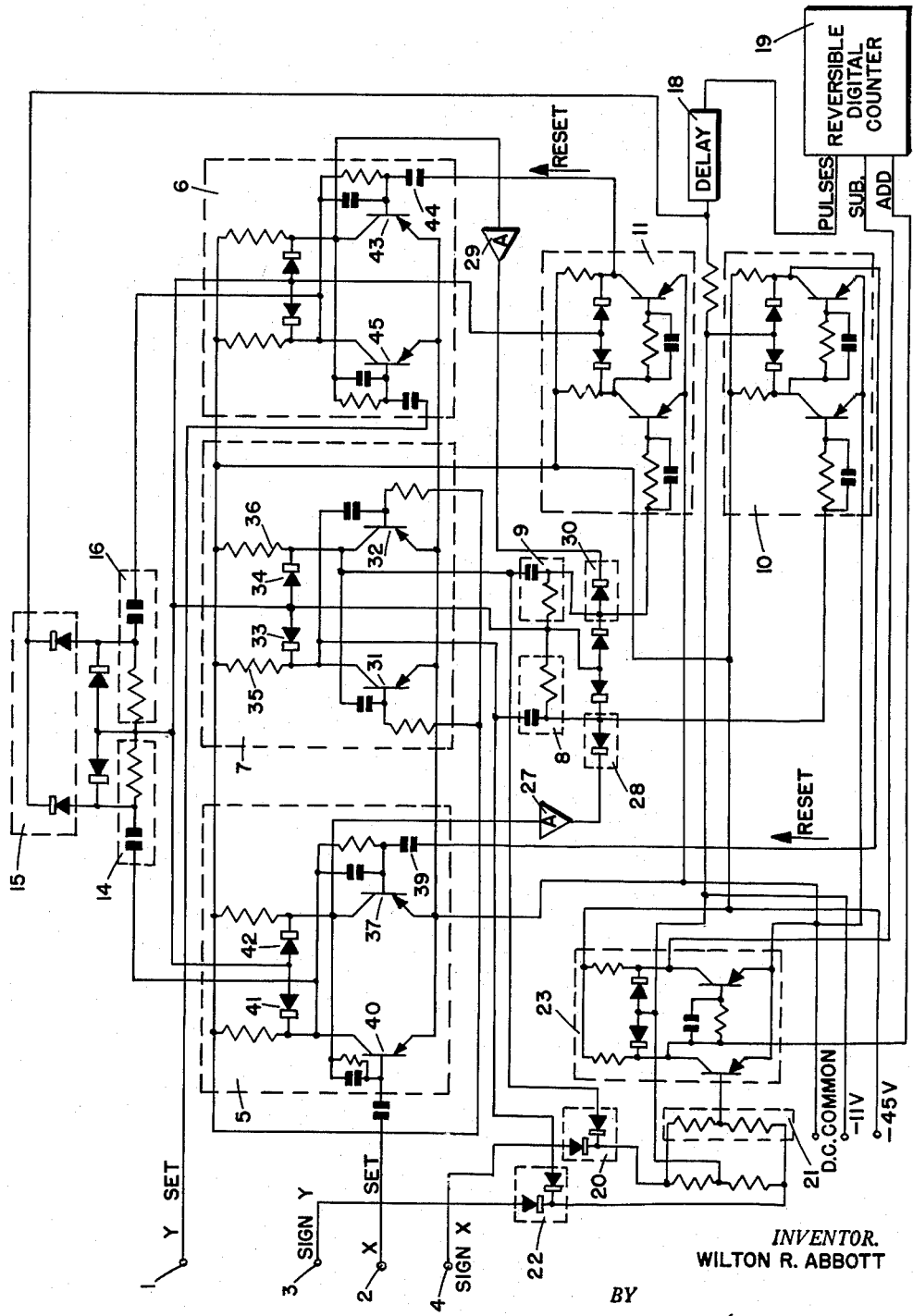

United States Patent Office 2,992,411
Patented July 11, 1961

2,992,411
RANDOM PULSE SYNCHRONIZER
Wilton R. Abbott, Whittier, Calif., assignor to North American Aviation, Inc.
Filed Feb. 16, 1956, Ser. No. 565,973
10 Claims. (Cl. 340—167)

This invention relates to the synchronizing and gating of signals received from two unsynchronized sources. More particularly, it relates to synchronizing two signal inputs of random frequency distribution, storing the signals temporarily, and releasing them at a rate which does not exceed the distinguishing capabilities of subsequent equipment. The problem occurs, for example, in feeding a plurality of unsynchronized, random pulse inputs to a single digital machine such as a counter.

In combining digital signals from unsynchronized sources, the problem immediately arises as to the possibility of pulses arriving from the sources at the same instant and information thus being lost. The problem also extends to information arriving first from one source and then from the second source at an interval smaller than that at which the device can capably resolve the signals. It is desirable in such devices that a means be provided for establishing the maximum rate at which pulses from separate sources are fed into a digital device and, further, that some sort of storage means be provided to hold the pulses until they are so fed. A further feature may be found from such synchronizing operation in that if the signs of the signals are also being handled, the spacing and synchronizing of the signals allow sufficient time to produce the sign signal.

It is an object, therefore, of this invention to provide an improved random pulse synchronizer.

It is another object of this invention to provide a random pulse synchronizer capable of receiving coincidental inputs from separate sources and providing a synchronized output.

It is another object of this invention to provide a random pulse synchronizer which produces a synchronized output at an acceptable rate.

A further object of this invention is to provide a random pulse synchronizer providing for storing random input signals and releasing the signals at an acceptable rate.

A still further object of this invention is to provide for storing random input signals, determining the signs of the signals and passing the signs and the signals as an output at an acceptable rate.

A still further object of this invention is to provide a random pulse synchronizer receiving signals from unsynchronized sources and combining the signals and releasing them at an acceptable rate together with the signs of the signals.

Other objects of invention will become apparent from the following description taken in connection with the accompanying drawings, in which FIG. 1 is a block diagram of a first embodiment of the device of the invention;

Figure 3:
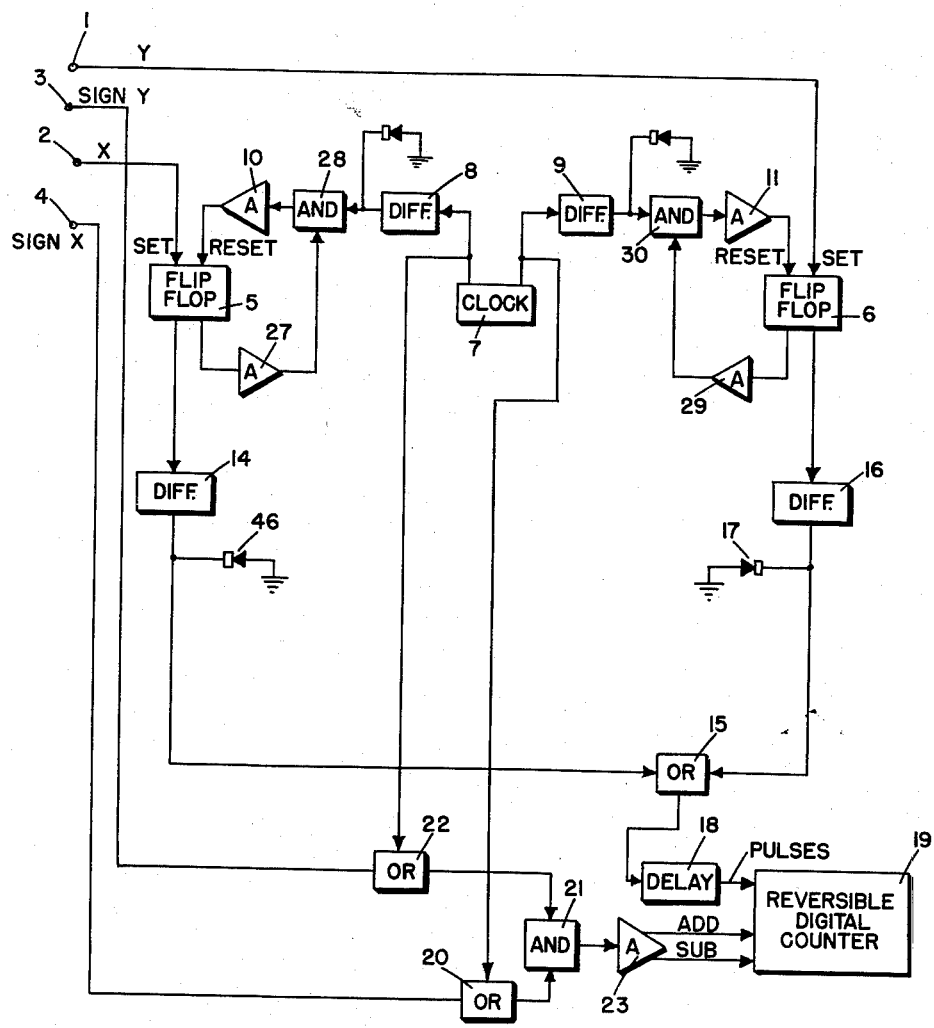
FIG. 3 is a block diagram of a third embodiment of the device of the invention.

And FIG. 4 is an electrical schematic of the device of FIG. 3.

Figure 1:
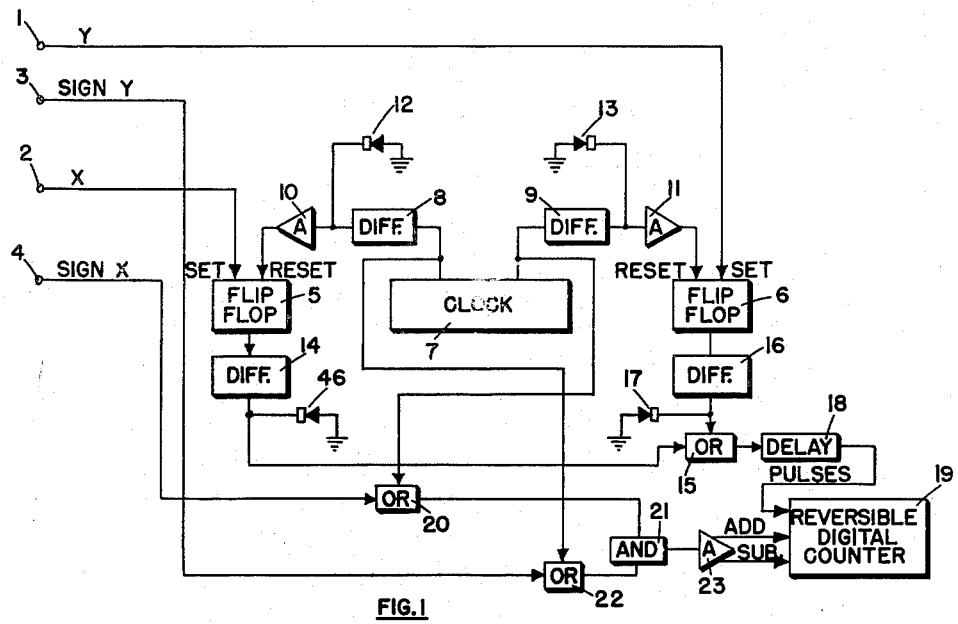

Referring to FIG. 1, unsynchronized signals, Y and X, are received at terminals 1 and 2, respectively. The signs of the signals are received at terminals 3 and 4, respectively, as voltage levels. Terminal 2 is connected to set flip-flop 5 and terminal 1 is connected to set flip-flop 6. These flip-flops are reset by a synchronizing source such as free-running multivibrator 7 operating through differentiators 8 and 9 and amplifiers 10 and 11. Diodes 12 and 13 act to remove pulses of incorrect polarity from the output of the differentiators 8 and 9. Whenever flip-flop 5 is reset, an output passes through differentiator 14 to "or" gate 15. The same is true as to flip-flop 6; whenever it is reset, an output pulse passes through differentiator 16 to "or" gate 15. Diodes 46 and 17 remove pulses of incorrect polarity from the input to "or" gate 15, so that only when the flip-flops are reset is a pulse received at "or" gate 15. The output of "or" gate 15 then passes through delay 18 to reversible digital counter 19.

At this point, it may be noted that free-running multivibrator 7, which also may be termed a clock or a synchronizing source, acts to reset flip-flops 5 or 6 whenever they need it (i.e., having received inputs). It will be noted that flip-flop 5 is reset at alternate intervals with flip-flop 6. Therefore, the outputs of these flip-flops are never coincidental. Also, it may be noted that there is no output until the flip-flop has received an input which requires resetting. Therefore, the output of "or" gate 15 and delay 18 to counter 19 is a summation of the pulses X and Y at the regularly spaced alternate intervals allowed by multivibrator 7. As the pulses X and Y are passed into counter 19 it is desirable that the corresponding sign signals slightly precede the pulses in order that the counter can be placed in the addition or subtraction mode prior to the time when the pulse is received. "Or" gate 20 is connected to receive the sign signal of X from terminal 4 and the output from multivibrator 7 and passes these signals to "and" gate 21. "Or" gate 22 is connected to receive the sign signal of Y from terminal 3 and the alternate output of multivibrator 7 and pass these signals to "and" gate 21. "And" gate 21 will then pass to amplifier 23 the voltage level received at terminals 3 and 4 at correct intervals, slightly preceding the passage of corresponding pulses into counter 19. Amplifier 23 thus acts to control the addition or subtraction mode of counter 19.

Figure 2:
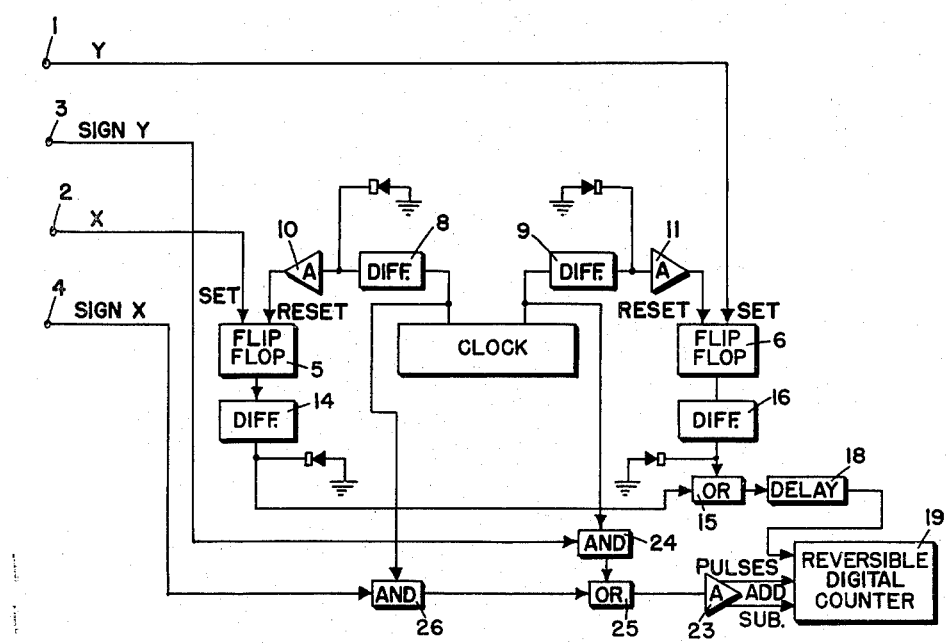
FIG. 2 is a block diagram of a second embodiment of the device of the invention.

FIG. 2 illustrates an alternate method of control of sign signals into the counter 19. The passage of pulses Y and X from terminals 1 and 2 through the flip-flops and differentiators into the counter 19 is substantially the same as in FIG. 1. However, in this illustration, the manner of passing the sign signals is changed. It will be noted that, in this case, "and" gate 24 is connected to receive the sign signals from terminal 3 and pass that signal to "or" gate 25 at the instant the reset pulse goes out to reset flip-flop 6. As flip-flop 6 is reset and the pulse passes on to delay 18, the voltage level from "or" gate 25 passes into amplifier 23 and the counter 19 is set previous to the reception of the pulse from delay 18. "And" gate 26, likewise, is connected to receive the X sign signal from terminal 4 and is gated according to multivibrator 7 as the reset signal goes out to flip-flop 5. The X sign signal thus passes on through "or" gate 25 and amplifier 23 to set counter 19 in the correct addition or subtraction mode according to the X output of flip-flop 5.

Due to certain difficulties of operation and transient effects and instability, a modified circuit may be required as illustrated in FIG. 3 which is substantially the idea shown in FIG. 1 so far as the passage of sign signals is concerned. It appears in FIG. 1 that, in certain instances, an output may be received from flip-flop 5 by differentiator 14 even though the flip-flop did not require resetting, merely because a pulse was received by flip-flop 5 from multivibrator 7. Therefore, to eliminate the possibility of flip-flop 5 receiving reset pulses when it does not require resetting, the circuit of FIG. 3 is incorporated in which is included an amplifier 27 connected to receive the reset output of flip-flop 5, "and" gate 28 connected to receive the output of differentiator 8 and thus amplifier 10 receives no output from differentiator 8 unless flip-flop 5 requires resetting. In other words, it has been insured that flip-flop 5 receives no reset pulse when it does not require resetting. A similar circuit is included for flip-flop 6 in which an amplifier 29 feeds back to "and" gate 30 to control the passage of pulses from the clock 7 to amplifier 11.

FIG. 4 is a transistorized schematic diagram of FIG. 3 in which a free-running multivibrator 7 comprising two transistors 31 and 32 which alternately conduct and provide outputs from their collectors to differentiators 8 and 9 and "or" gates 20 and 22. Diodes 33 and 34, together with resistors 35 and 36, act as clamps to limit the negative values of the output of multivibrator 7. Amplifier 27, receiving the reset output from transistor 37 of flip-flop 5, controls "and" gate 28 to allow or prevent pulses from passing to amplifier 10 to reset flip-flop 5 through capacitor 39. Upon reset, transistor 37 is cut off and transistor 40 is caused to conduct until a positive set pulse is again received from terminal 2. Flip-flop 5 includes clamping diodes 41 and 42 similar to the clamping diodes in multivibrator 7. Amplifier 29 is connected to receive the reset output from transistor 43 of flip-flop 6 and pass it to "and" gate 30 which receives the output of differentiator 9 and passes the information to amplifier 11 which acts to reset flip-flop 6 through capacitor 44. Upon reset, transistor 43 is caused to stop conduction and transistor 45 commences conducting, awaiting the next set pulse received at terminal 1. Flip-flops 5 and 6 are thus reset according to the scheme of FIG. 3. The output of flip-flop 5 is received by differentiator 14 and passed to "or" gate 15. This particular mechanization of "or" gate 15 allows pulses of only one direction to pass and therefore also accomplishes the purposes of diodes 46 and 17 in FIG. 3. The output of flip-flop 6 is passed to differentiator 16 and then to "or" gate 15. The output of "or" gate 15 is received by delay 18 and passed to reversible digital counter 19. As in FIG. 3, "or" gate 20 receives information from terminal 4, sign X, and from clock 7 and passes it to "and" gate 21. "And" gate 21 also receives information from "or" gate 22 which received its information from clock 7 and terminal 3, sign Y. Amplifier 23 receives the output of "and" gate 21 and provides in double-ended output the add and substract indications to digital counter 19. Amplifiers 27 and 29, drawn in diagram form may be mechanized, for example, in the same manner as amplifier 10 or 11.

The device of the invention, therefore, provides the X pulses and the Y pulses to the digtal counter 19 at a rate not exceeding that determined by the multivibrator or clock source. The synchronizing clock source also gates the sign signals into the digtal counter indicating whether the pulses are to be added or subtracted. Each sign signal is synchronized to arrive at the digital counter slightly before its respective pulse. This obtained by the synchronizing action of the clock source 7 and delay 18 which retard the pulses slightly.

Although this invention has been described and illustrated in detail, it is to be clearly understood that the same is by way of illustration and example only and is not to be taken by way of limitation, the spirit and scope of this invention being limited only by the terms of the appended claims.

I claim:

1. In a random input signal synchronizer, a first storage device for receiving a first random input signal distinguishable as to sign, a second storage device for receiving a second random input signal, distinguishable as to sign, a synchronizing clock pulse source connected to reset alternatively said first and second storage devices, means connected to receive the output of said storage devices and to indicate the information contained therein, signal gating means for receiving the sign signals of said first and second random input signals, said signal gating means connected to be controlled by said synchronizing clock pulse source.

2. In a random input signal synchronizer, a first storage device for receiving a random input signal distinguishable as to sign, a second storage device for receiving a second random input signal distinguishable as to sign, a clock pulse source connected to reset alternatively said first and second storage devices, signal gating means for receiving the sign signals of said first and second random input signals, said signal gating means connected to be controlled by said clock pulse source, and differentiating means connected to receive the output of said storage devices, said differentiating means providing signals indicating the change of state of said storage devices.

3. In a random input signal synchronizer, a first binary storage device for receiving a first random input signal distinguishable as to sign, a second binary storage device for receiving a second random input signal distinguishable as to sign, a synchronizing signal source connected to reset alternatively said first and second storage devices, means connected to receive the output of said storage devices and to indicate the information contained therein, a first signal gating means for receiving the sign signal of said first random input signal, a second signal gating means for receiving the sign signal of said second random input signal, said signal gating means connected to be controlled by said synchronizing signal source whereby is provided a synchronized output of said random signals and their sign signals.

4. In a random input signal synchronizer, a first flip-flop for receiving a first random input signal distinguishable as to sign, a second flip-flop for receiving a second random input signal distinguishable as to sign, a clock pulse source connected to reset said first and second flip-flops alternately, means connected to receive the output of said flip-flops and to indicate the information contained therein, a first signal gating means for receiving the sign signal of said first random input signal, a second signal gating means for receiving the sign signal of said second random input signal, said signal gating means connected to be controlled by said clock pulse source whereby is provided a synchronized output of random signals and their sign signals.

5. In a random input signal synchronizer, a first flip-flop for receiving a first random input signal distinguishable as to sign, a second flip-flop for receiving a second random input signal distinguishable as to sign, a clock pulse source connected to reset said first and second flip-flops alternately, a first signal gating means for receiving the sign signal of said first random input signal, a second signal gating means for receiving the sign signal of said second random input signal, said signal gating means connected to be controlled by said clock pulse source alternately, a first differentiating means connected to receive the output ofsaid first flip-flop, and a second differentiating means connected to receive the output of said second flip-flop whereby is provided synchronized output of said random input signals and their sign signals.

6. In a random input synchronizer, a first flip-flop for receiving a first random input signal distinguishable as to sign, a second flip-flop for receiving a second random input signal distinguishable as to sign, a clock pulse source having a first output and a second alternate output, said clock pulse source connected to reset said first and second flip-flops alternately, means connected to receive the output of said flip-flops and indicate the change of information contained therein, a first "or" gating means for receiving the sign signals of said first random input signal and the first output of said clock pulse source, a second "or" signal gating means for receiving the sign signal of said second random input signal and connected to receive the alternate output of said clock pulse source, and "and" gating means connected to receive the output of said "or" gating means whereby is provided synchronized output of said random input signals and their sign signals.

7. In a random input synchronizer, a first flip-flop for receiving a first random input signal distinguishable as to sign, a second flip-flop for receiving a second random input signal distinguishable as to sign, a clock pulse source providing a first and second output signal at alternate intervals, a first "and" gating means connected to receive the first signal of said clock pulse source, a second "and" gating means connected to receive the second signal of said clock pulse source, said first "and" gating means connected to receive the output of said first flip-flop, said second "and" gate connected to receive the output of said second flip-flop, said first "and" gate connected to reset said first flip-flop, said second "and" gate connected to reset said second flip-flop, a first differentiating means connected to receive the output of said first flip-flop, a second differentiating means connected to receive the output of said second flip-flop, a first "or" gating means connected to receive the output of said differentiating means, a second "or" gating means for receiving the sign signal of said first random input signal and connected to receive the second signal from said clock pulse source, a third "or" gating means for receiving the sign signal of said second random input signal and connected to receive the first signal of said clock pulse source, "and" gating means connected to receive the output of said second and third "or" gating means, whereby is provided from said first "or" gate said random input signals in alternate synchronized rate and from said third "and" gating means the signs of said signals at synchronized rate.

8. The combination recited in claim 7 wherein is included a delay connected to receive the output of said first "or" gating means whereby the sign signals are received before the random input signals.

9. In a random input synchronizer, a first flip-flop for receiving a first random input signal distinguishable as to sign, a second flip-flop for receiving a second random input signal distinguishable as to sign, a clock pulse source providing a first and second synchronizing signal at alternate intervals, said clock pulse source connected to reset said first flip-flop by one of said signals and connected to reset said second flip-flop by the other of said signals, a first differentiating means connected to receive the output of said first flip-flop, a second differentiating means connected to receive the output of said second flip-flop, a first "or" gating means connected to receive the output of said differentiating means, a first "and" gating means for receiving the sign signal of said first random input signal and connected to receive the first synchronizing signal from said clock pulse source, a second "and" gating means connected for receiving the sign signal of said second random input signal and connected to receive the second synchronizing signal from said clock pulse source, a second "or" gating means connected to receive the output of said "and" gating means.

10. The combination recited in claim 9 wherein is included a delay means connected to receive the output of said first "or" gating means, whereby output sign signals of the device of the invention precede the synchronized random signals.

References Cited in the file of this patent

UNITED STATES PATENTS

| | | |
|---|---|---|
| 1,221,443 | Hall | Apr. 3, 1917 |
| 2,389,275 | Rayner | Nov. 20, 1945 |
| 2,552,968 | Hochwald | May 15, 1951 |
| 2,649,543 | Trachtenberg | Aug. 18, 1953 |
| 2,656,106 | Stabler | Oct. 20, 1953 |
| 2,700,155 | Clayden | Jan. 18, 1955 |
| 2,795,695 | Raynsford | June 11, 1957 |
| 2,840,709 | Blankenbaker | June 24, 1958 |
| 2,874,343 | Steele | Feb. 17, 1959 |

FOREIGN PATENTS

| | | |
|---|---|---|
| 123,313 | Australia | Jan. 13, 1947 |